Feb. 18, 1958 W. D. McFADDEN ET AL 2,823,595
PHOTOGRAPHIC PROCESSING MACHINE
Filed July 27, 1954 8 Sheets-Sheet 1

William D. McFadden
William R. Weller
INVENTORS

BY Daniel I. Mayne
Frank R. Gollon
ATTORNEYS

Feb. 18, 1958 W. D. McFADDEN ET AL 2,823,595
PHOTOGRAPHIC PROCESSING MACHINE
Filed July 27, 1954 8 Sheets-Sheet 2

William D. McFadden
William R. Weller
INVENTORS

BY Daniel I. Mayne,
Frank R. Gollon
ATTORNEYS

Feb. 18, 1958 W. D. McFADDEN ET AL 2,823,595
PHOTOGRAPHIC PROCESSING MACHINE
Filed July 27, 1954 8 Sheets-Sheet 3
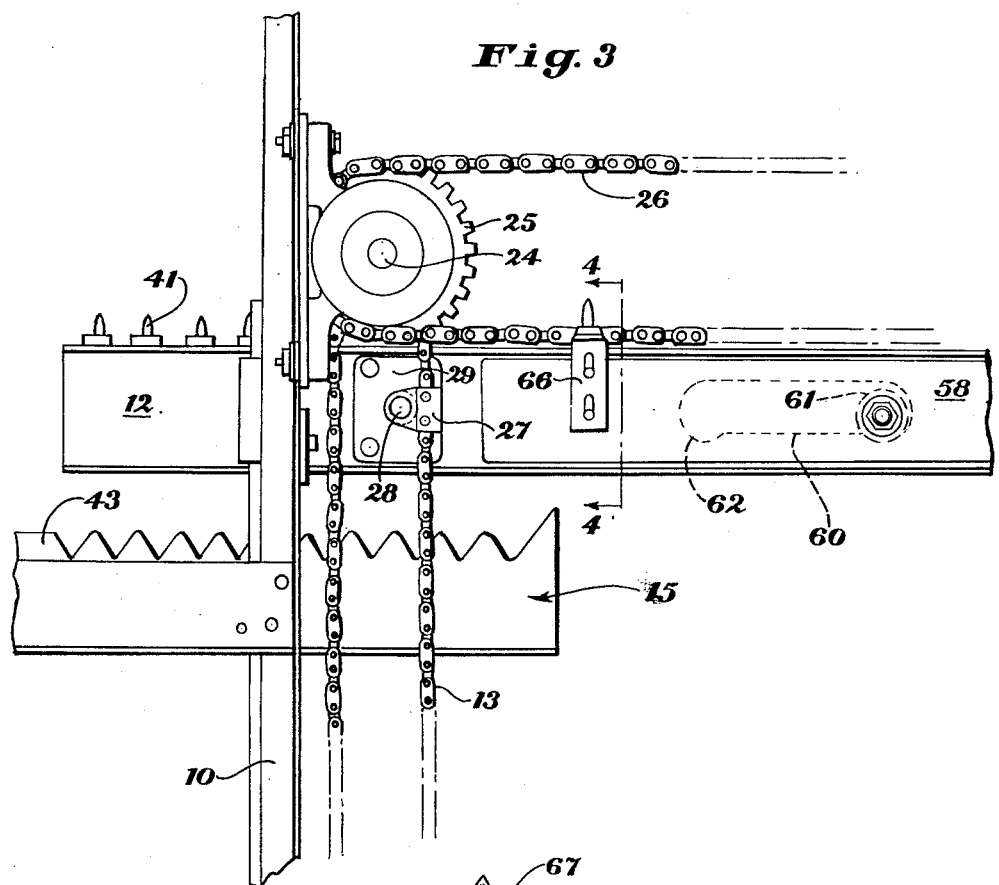
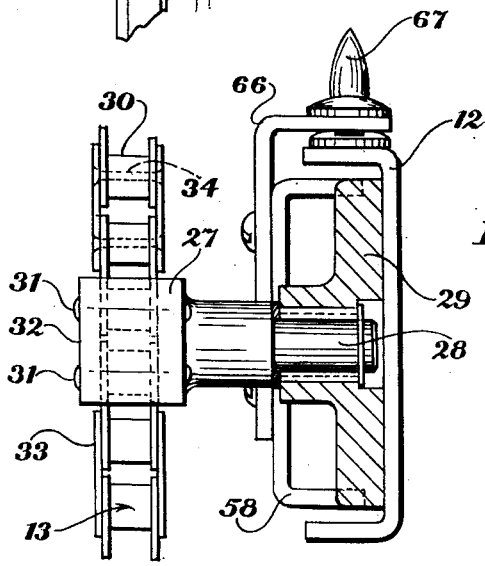
WilliamD.McFadden
WilliamR.Weller
INVENTORS
ATTORNEYS Feb. 18, 1958 W. D. McFADDEN ET AL 2,823,595
PHOTOGRAPHIC PROCESSING MACHINE
Filed July 27, 1954 8 Sheets-Sheet 4
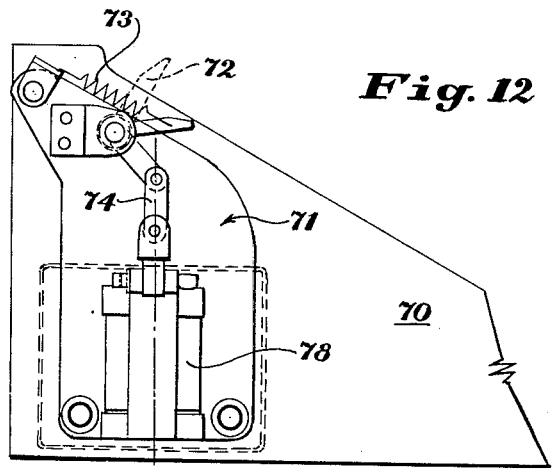
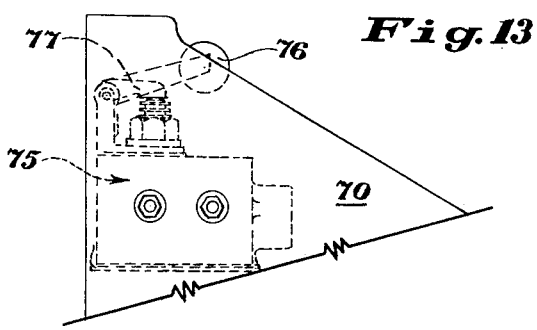
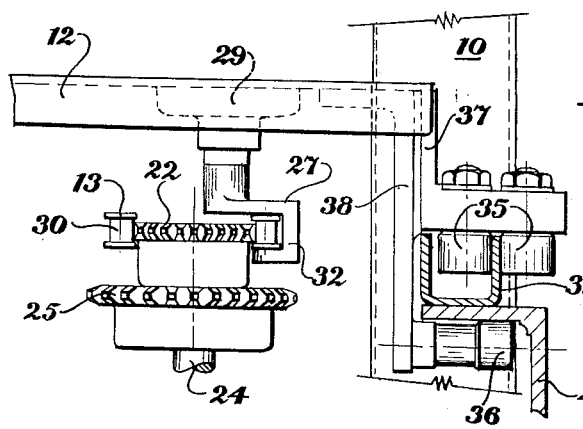
William D. McFadden
William R. Weller
Daniel I. Mayne
Frank R. Gollon
INVENTORS
BY
ATTORNEYS Feb. 18, 1958  W. D. McFADDEN ET AL  2,823,595
PHOTOGRAPHIC PROCESSING MACHINE
Filed July 27, 1954  8 Sheets-Sheet 5

William D. McFadden
William R. Weller
INVENTORS
BY Daniel I. Mayne
Frank R. Gollon
ATTORNEYS Feb. 18, 1958 W. D. McFADDEN ET AL 2,823,595
PHOTOGRAPHIC PROCESSING MACHINE
Filed July 27, 1954 8 Sheets-Sheet 6
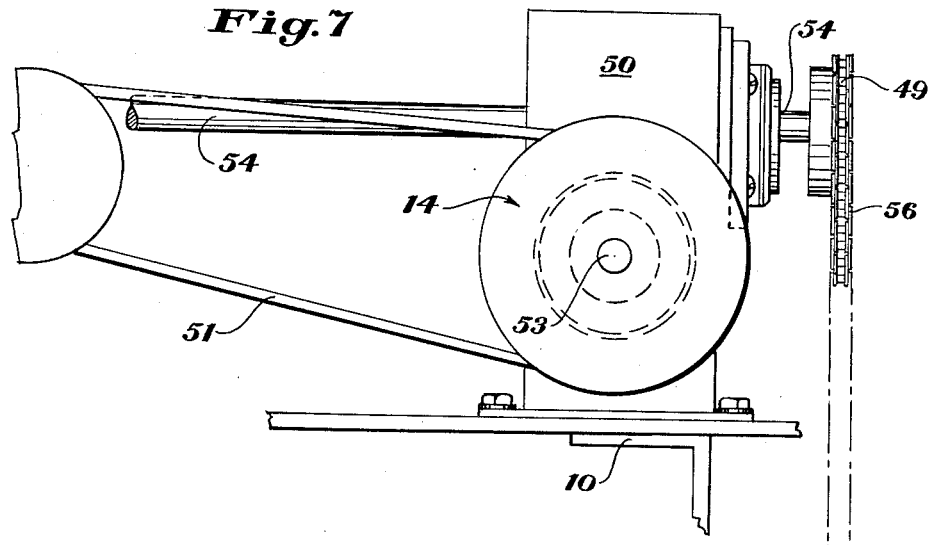
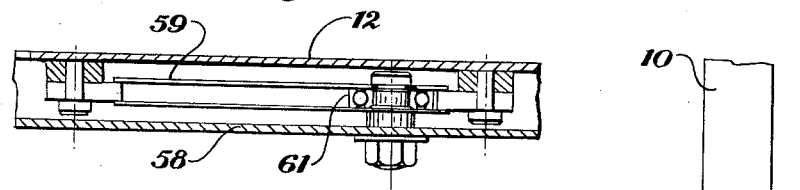
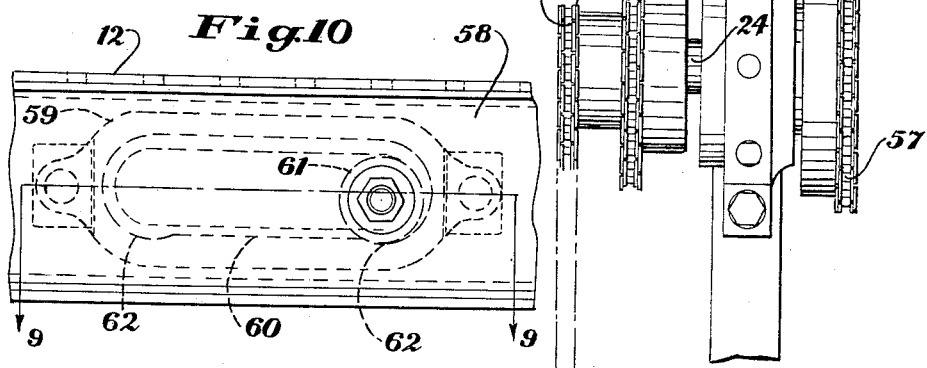
William D. McFadden
William R. Weller
INVENTORS
BY Daniel S. Mayne
Frank R. Gollon
ATTORNEYS

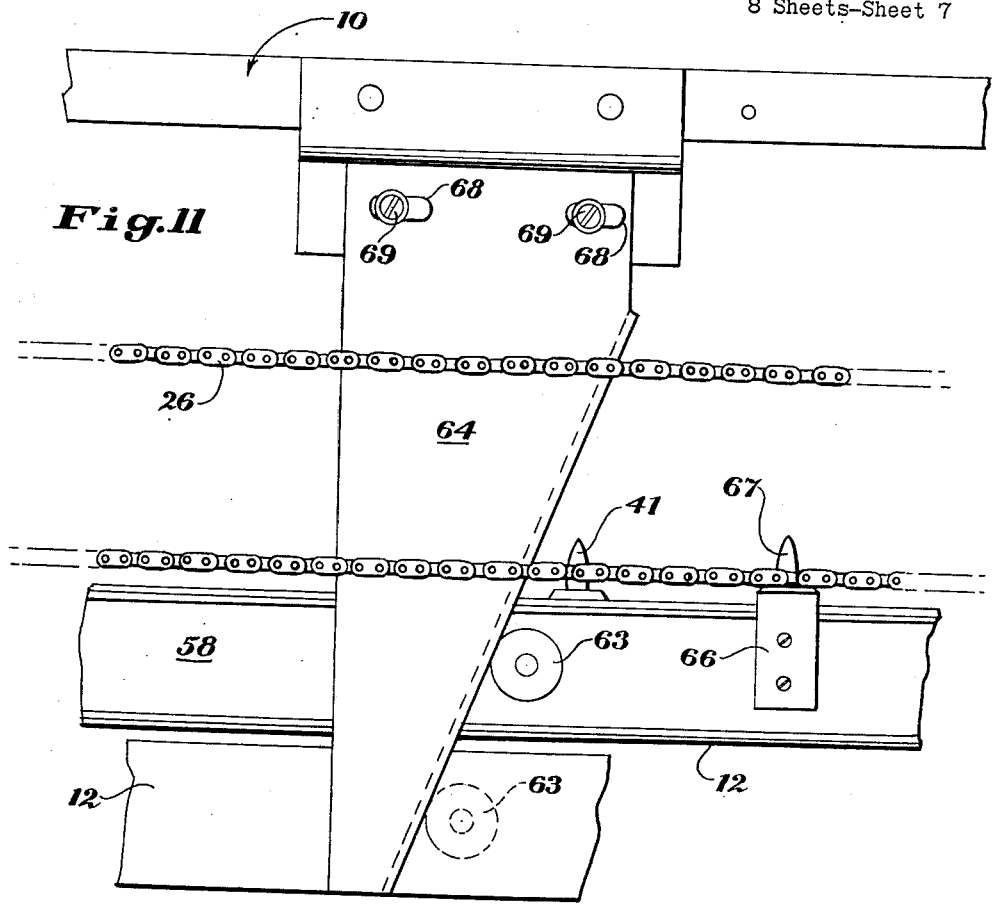
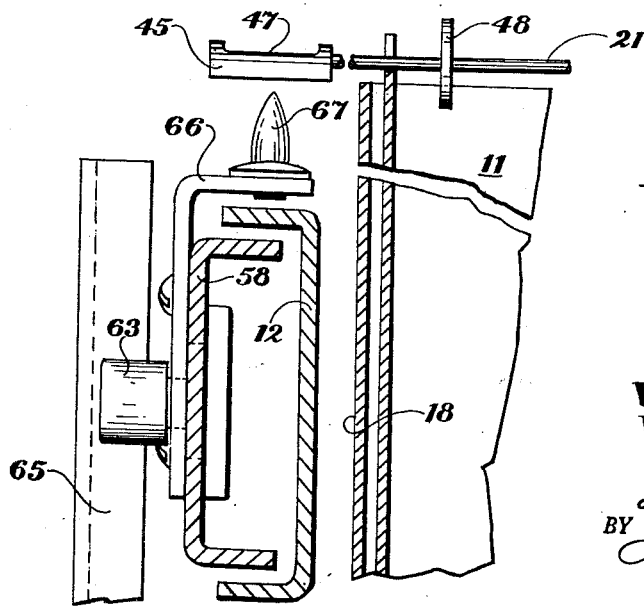

Feb. 18, 1958  W. D. McFADDEN ET AL  2,823,595
PHOTOGRAPHIC PROCESSING MACHINE
Filed July 27, 1954  8 Sheets-Sheet 8

William D. McFadden
William R. Weller
INVENTORS
BY Daniel I. Mayne
Frank R. Hollon
ATTORNEYS United States Patent Office 2,823,595
Patented Feb. 18, 1958

2,823,595
PHOTOGRAPHIC PROCESSING MACHINE

William D. McFadden and William R. Weller, Rochester, N. Y., assignors to Eastman Kodak Company, Rochester, N. Y., a corporation of New Jersey Application July 27, 1954, Serial No. 446,132

12 Claims. (Cl. 95—98)

This invention relates to a photographic processing machine and more particularly to a machine adapted for the processing of sheet film. Specifically, it relates to a processing machine which is automatic in its operation and in which the sheets are cyclicly immersed in and lifted out of the treating solutions as they progress step by step through the several tanks.

It is well known to employ in the processing of discrete sheets a machine employing lift chains which transfer the sheet or film holders from one processing tank to the next. It is also well known to employ lift rails which reciprocate between raised and lowered positions and in so doing advance the films step by step longitudinally the length of the several processing tanks. Machines of the latter type are ordinarily adapted to traverse the sheets through the individual tanks in fixed increments of travel. Moreover, a shortcoming apparent in such apparatus was the fact that drainage of excess solutions from the sheets withdrawn from the tanks was not sufficiently complete to preclude the contamination of the solutions in successive tanks. This resulted partly from the fact that the supporting bars of the hangers or film holders were retained in a horizontal position as these were vertically raised in withdrawing the several sheets from the tanks, the bottom edges of the sheets being thereby held horizontal.

In the present invention the positions of the lift rails are so related to each other that the upper and lower edges of the sheet film are tilted or inclined during the lift portion of the cycle and on the return or downward travel of the sheets, this inclination is reversed in the opposite direction. Such a sequence of motions closely approximates the recommended procedure for the hand processing of sheet film in that it thereby provides a point drain-off of those solutions, which adhere to the film when this is raised out of the processing tanks, alternately from each of the two lower corners of the sheet being processed.

As above noted, prior art machines provided a step-by-step advance through the tanks without providing any readily adjustable means for varying this step-by-step travel through the solutions in the several tanks. The present invention includes a selective advance mechanism whereby the step-by-step advance through the several tanks may be varied to reduce the total time that the sheet is immersed in any particular tank by varying the number of the immersions therein. This selective advance mechanism also facilitates the transfer of the sheets being processed from one tank to the next.

A still further feature of the present invention is the loading and unloading devices associated with the processing apparatus which automatically cooperate with the operation of the lift rails to facilitate the loading and unloading operations.

It is, therefore, an object of the present invention to provide a new and improved apparatus which is especially adapted for the processing of sheet film.

It is a further object of this invention to provide a new and improved processing machine which is adapted for automatic operation whereby the several steps of processing are automatically effected in the desired sequence.

It is a still further object of this invention to provide an apparatus of the character described in which the processing times in the several tanks may be relatively varied by varying the relative number of immersions in each tank by lengthening or shortening, as the case may be, the step-by-step travel through the several tanks.

It is a still further object of this invention to provide an apparatus of the character described which includes automatic means facilitating the drainage of solutions adhering to the films when these are raised out of the processing tanks between successive immersions, such operation closely approximating the procedure recommended for the hand processing of sheet film.

It is a still further object of this invention to provide an apparatus of the character described which includes loading and unloading means associated therewith which facilitate these operations without requiring the constant attendance of the operator.

It is a still further object of this invention to provide an apparatus for the purpose described which is simple in its construction, yet foolproof in its operation.

Other objects and advantages of the invention will become apparent from the following description taken in connection with the accompanying drawings, and it will be understood that many changes may be made in the details of construction and arrangement of parts shown and described without departing from the spirit of the invention as expressed in the accompanying claims. We, therefore, do not wish to be limited to the exact details shown and described as the preferred form only has been shown by way of illustration.

In the drawings:

Fig. 3 is an enlarged partial view in elevation, illustrating the loading end of the apparatus and specifically showing the manner in which a lift rail is secured to a lift chain to be driven thereby;

Fig. 4 is an enlarged sectional view taken on the line 4—4 of Fig. 3, illustrating the means by which the lift rail is pivotally connected to a lift chain;

Fig. 5 is an enlarged fragmentary view in plan, of one end of a lift rail illustrating the mounting thereof to a lift chain and further illustrating the roller construction at the end thereof for guiding the vertical movement of the rail;

Fig. 7 is an enlarged view in elevation, showing the drive means which operates the several lift chains in synchronism and at identical speeds;

Fig. 8 is an enlarged sectional view showing the roller on a slide bar in contact with one of the two lower cams whereby longitudinal motion is imparted to the slide bar and, in addition, showing the positional relationship between these elements and the tank and sheet holder;

Fig. 9 is an enlarged sectional view taken on the line 9—9 of Fig. 10, illustrating the guide bracket and coacting roller by which the slide bar may be shifted relatively to the lift rail;

Fig. 10 is a fragmentary front view of the lift rail and slide bar showing the construction of the guide bracket and coacting roller;

Fig. 11 is an enlarged view in elevation of one of the two upper cam elements, showing the manner in which this coacts with the roller on the slide bar to shift the latter longitudinally of the lift rail;

Fig. 12 is an enlarged view of a latch mechanism which may be mounted on one of the two slides comprising the unloading means;

Fig. 13 is an enlarged view of a microswitch to be used in conjunction with the above latch mechanism and which may be mounted on the other of the two slides.

Figure 1:
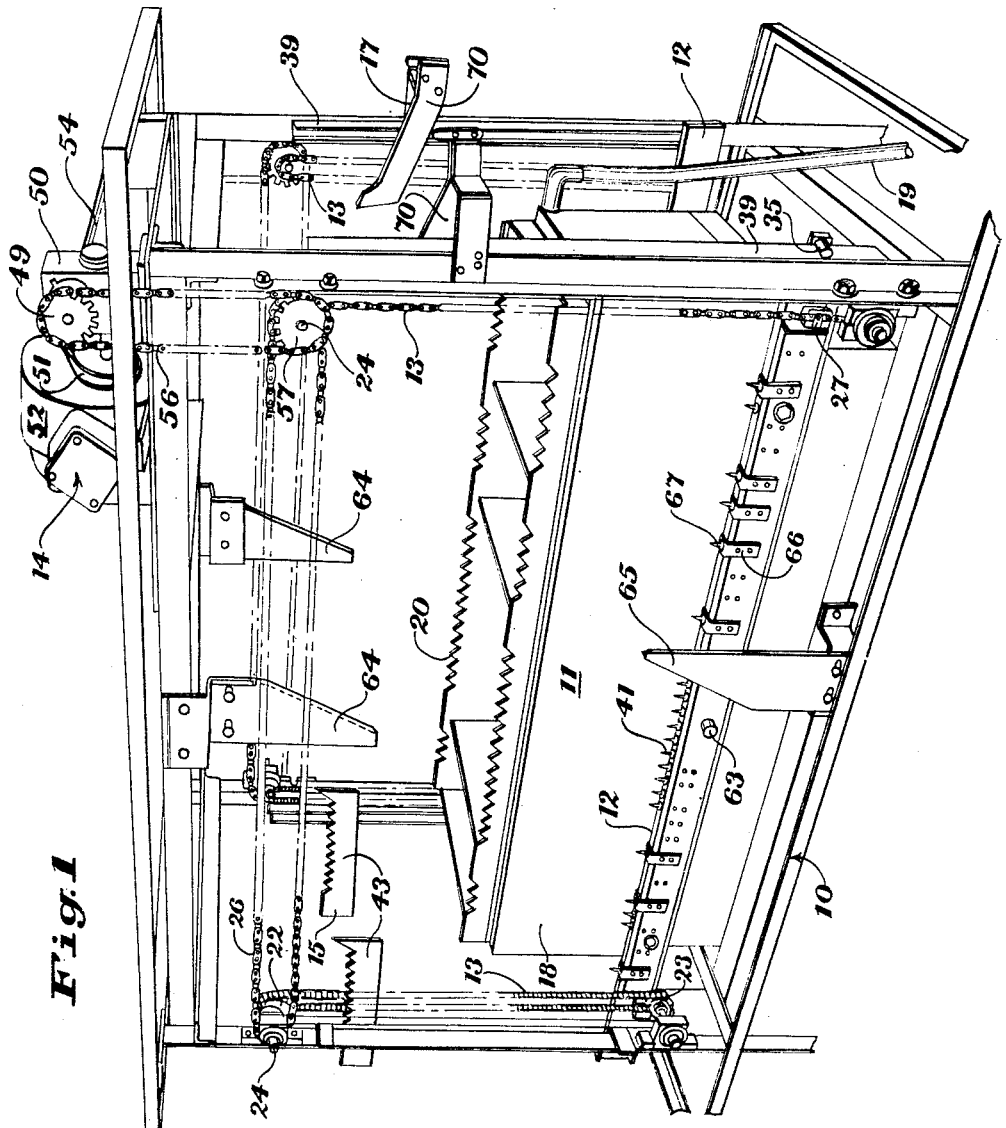
Fig. 1 is a side view in perspective of a sheet film processing machine embodying the present invention.

The preferred form of the present invention illustrated in Figs. 1 to 14, inclusive, includes a supporting frame 10, a series of tanks 11 supported thereon, a pair of lift rails 12 positioned on opposite sides of said tanks, and a series of lift chains 13 for operating said lift rails. In addition, a drive mechanism 14 is provided for driving the several lift chains. At one end of the apparatus there is also provided a loading or a feed rack 15 upon which sheet holders 16 are manually positioned by the operator from which they are carried by the operation of the lift rails and lift chains to the first of the several tanks in which they are sequentially immersed. At the other end of the apparatus there is provided an unloading rack 17 for the reception of the completely processed sheets on which they are retained until manually removed by the operator.

The series of tanks 11 are of a number corresponding to the number of baths required for the processing of the particular film. Their relative sizes or rather lengths depend upon the relative times of immersion that are required for the processing of the particular film although the time of immersion in each tank may be varied at the will of the operator by means of a feature of the invention which is described below. The tanks, too, are enclosed in a water jacket 18 for the purpose of temperature control, a supply pipe 19 being shown in Figs. 1 and 2 entering at an upper end of said jacket for the purpose of circulating the cooling liquid which flows from the jacket through a second pipe (not shown). The opposite sides of the several tanks have a series of notches 20 cut therein, as illustrated in Fig. 1, which serve the purpose of receiving the ends of the laterally-extending, supporting bar 21 of the sheet holders 16 as will be further described below.

The transport mechanism of the apparatus includes the pair of lift rails 12, of which one is positioned on each side of said tanks. Upward and downward movement of each rail is accomplished by means of a pair of lift chains 13 which, as will be seen, not only produce such vertical motion of the lift rails but also cause said rails to be longitudinally shifted in a forward and backward direction at the end of the upward and downward movements, respectively, of the rails 12. The lift chains 13 are driven by sprockets 22 at the upper ends of the chain loops, similar idler sprockets 23 being provided at the lower ends of the endless lift chains 13. To synchronize the movement of each of the two chains at the ends of the lift rail 12 the shafts 24 mounting the sprockets 22 further mount additional sprockets 25 which are of like size and connected by a sprocket chain 26 whereby shafts 24 may be driven at identical speeds to synchronize the operation of the lift chains 13.

The ends of each lift rail 12 are pivotally secured to corresponding links of the lift chains 13 located at the ends thereof. The manner of securing the ends of the lift rail 12 to the lift chains is shown in detail in Fig. 4. A bracket 27 includes at one end a pivot 28 rotatably mounted in a boss on member 29 which is secured to the lift rail 12. The pivotal connection between the bracket 27 and the member 29 permits the bracket 27 to thus rotate freely relative to the lift rail. The other end of the bracket 27 has formed thereon a U-shaped strap element 32 which is designed to enclose a pair of the cross or connecting pins 30 of the lift chain to which it is secured by the pins or rivets 31. It will be noted that the U-shaped strap 32 and the pins 31 therethrough replace the usual link bars 33 and pivot pins 34 which would ordinarily connect the two cross pins 30 which are enclosed by the U-shaped element 32. It will thus be obvious that as the lift rail approaches the top of the loop of the lift chain 13, the bracket 27 will rotate relative to the rail 12 as the portion of the chain to which the bracket is secured is engaged by and passes about the drive sprocket 22. Since the operation of the chains 13 on either end of the bar 12 are synchronized, as described above, it will be apparent that the lift rail remains horizontal at all times and that, as the brackets 27 on which the lift rail is supported pass about either the upper drive sprockets 22 or the lower idler sprockets 23, this rail is displaced longitudinally a distance determined by the width of the lift chain loop and the distance that the pins 31 through the bracket are offset from the pivot 28 at the other end thereof (see Fig. 5).

To preclude any undesirable longitudinal or crosswise motion of the lift rails occasioned by vibration of the unsupported reaches of the lift chains 13, the ends of the lift rails 12 are further provided with a system of rollers which are designed and intended to eliminate such undesired motion and yet permit the said lift rails to freely move upwardly and downwardly as they are transported by the lift chains. The mounting of the transverse rollers 35 and the roller 36 is illustrated in Fig. 5 of the drawings. Each end of each lift rail is provided with roller-mounting brackets 37 and 38. A vertical channel iron 39 secured to each corner of the supporting frame 10 provides rigid guide surfaces for the rollers 35, one channel edge serving as the guide surface as the lift rail moves upwardly, the other channel edge serving as such a surface as the lift rail moves downwardly. It will be apparent, too, that the width of the channel iron 39 is determined by the distance that the lift rail moves longitudinally as it changes from its upward to its downward motion or vice versa. This relationship will be apparent from an inspection of Fig. 5. Roller 36 mounted on the end of bracket 38 is intended to ride on the vertical guide surface of angle iron 40 which is of sufficient width to furnish a bearing surface for the roller 36 when the lift rail has been moved to either extremity of its longitudinal shift. As in the case of the channel irons 39, four vertical angle irons 40 are provided, one at each corner of the supporting frame 10.

Each of the lift rails 12 is actually U-shaped in cross section in the upper leg of which is provided perforations in which are removably mounted a series of lift pins 41. These lift pins, as will be described, serve the purpose of engaging the sheet holders 16 to raise and lower the holders out of and into the several processing tanks 11. Each sheet holder comprises a conventional frame 42 to which a sensitized material may be attached, the frame depending from the supporting bar 21 at the ends of which are located perforated elements 44 and 45 intended to be engaged by the above-described lift pins. The perforated element 44 is furnished with a hole 46 which is only slightly larger than the diameter of the lift pin 41 whereas the perforated element 45 has a slot 47 therein, the width of which is only slightly larger than the pin diameter, the length of which, however, is several times the said pin diameter. The need for a slot rather than a round opening in one of the elements 44 and 45 will become apparent as the motion of the sheet holders into and out of the processing tanks is described. The supporting bar 21 is of such diameter that it rests easily in the V-shaped notches 20 which are provided on the opposite sides of the series of tanks. Discs 48 are provided near the extremities of each supporting bar. These function primarily as positioning means, in that when a sheet holder is first placed by the operator on the loading or feed rack 15 with the discs on the supporting bar located between the two notched elements 43 which comprise the rack 15, the perforated elements 44 and 45 on the supporting bar of said holder will have their openings correctly alined with the pins 41 on the lift bars which are approaching these from below. In addition, such disc means cooperating with the slides 70, which comprise the unloading rack 17, also function to keep the sheet holders from falling off the latter by precluding any lateral shifting thereon of sufficient amount to cause one end of the supporting bar 21 to leave a slide 70. The construction of the described sheet holder 16 and, in particular, the construction of the supporting bar 21 and the elements secured thereon is clearly illustrated in Fig. 6.

It will be understood that, when the lift rails 12 on both sides of the tanks 11 are moving below the top edges of the tanks, the supporting bars 21 of the sheet holders 16 will be at rest in certain of the V-shaped notches on the upper edges of said tanks whereby these sensitized sheets will be immersed in the solutions in the several tanks. However, as the lift rails move vertically and pass above the top edges of the tanks, the lift pins 41 thereon will engage in the hole and slot 46 and 47, respectively, of the perforated elements at the ends of the several supporting bars and, as the lift rails continue to rise above the level of the upper edges of the several tanks, they will raise the sheet holders out of the tanks. After the lift rails have completed their upward movement and after the brackets 27 by which they are mounted to the respective lift chains 13 have passed around the sprockets 22, the rails 12 begin to descend. In the course of passing over and around the sprockets 22 the brackets 27 have obviously caused the lift rails 12 to shift longitudinally and thereby move the sheet holders through a like distance in the direction of the length of the processing apparatus. As the rails 12 now descend, they pass below the upper edges of said tanks and in doing so deposit the supporting bars 21 of the several film holders in notches formed in the opposite edges of the tanks, which notches are spaced from the immediately previous notches in which the supporting bars rested a distance equal to the longitudinal shift of the lift rails 12. In this manner the sheet holders 16 are caused to move in a direction along the length of the tanks. As the lift rails continue their motion below the level of the tops of said tanks, they approach the bottom of the lift chain loops and the brackets 27 are now carried about the lower idler sprockets 23, in doing which, it will be apparent, the lift rails are now shifted rearwardly the same distance they were previously shifted forwardly. Since the operation is a continuous one, this cycle is now repeated and the lift rails again rise to again engage the ends of the supporting bars of the sheet holders to lift the latter from the tanks and again advance them through a distance which is equal to the longitudinal movement of the lift bar (which is also equal to the pitch or spacing of the V-shaped notches in the upper edges of the tanks). It is thus apparent that the above operation will cause the holders for the sensitized materials to be sequentially immersed and raised out of the processing solutions in the course of which they also traverse the lengths of the processing tanks.

Figure 2:
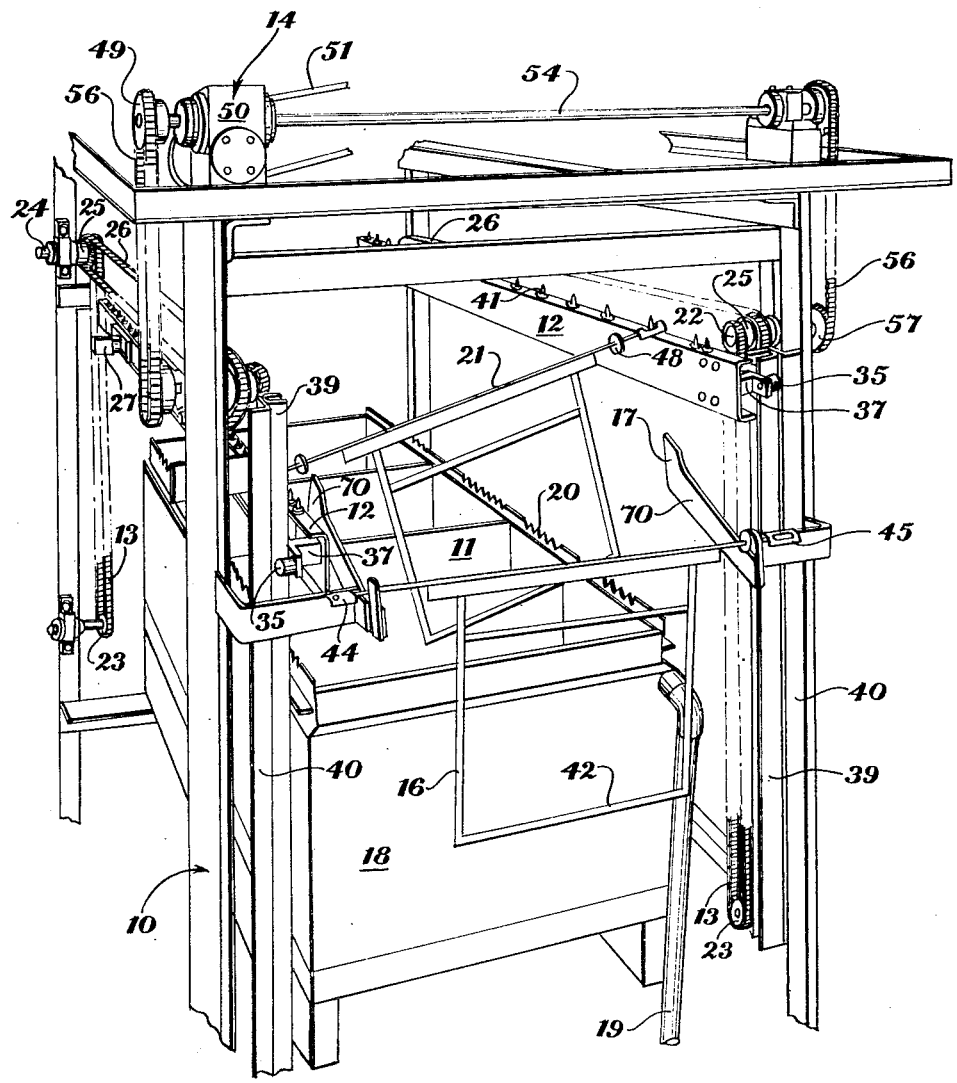
Fig. 2 is an end view of such a machine, also in perspective.
Figure 6:
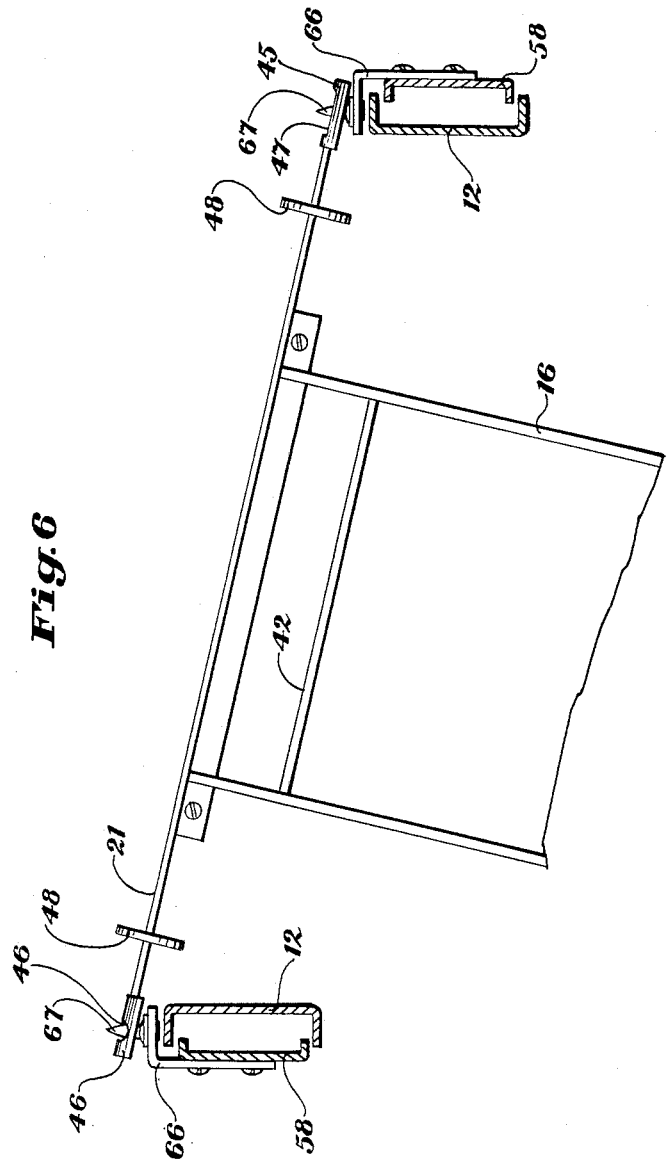
Fig. 6 is an enlarged view of a sheet holder showing the manner in which it is supported by the lift rails in an inclined position.

An important feature of the invention as previously indicated in the stated object of invention is the means which automatically facilitates drainage of the processing fluids from the sensitized sheets as these are lifted out of the several processing solutions. This is effectively accomplished by the following means. Although each of the two lift rails 12 always remains horizontal because of the manner in which the operation of the two lift chains to which the rail is fastened is synchronized, the operation of the pair of lift chains which actuate the one lift rail is further synchronized with the operation of the other pair of lift chains which actuate the other of the two lift rails. The latter synchronization is obtained by positively connecting the two drive sprockets 49 to the output shaft 54 which extends from opposite sides of gear reduction box 50 whereby these sprockets are driven at identical speeds. A belt connection 51 between motor 52 and the input shaft 53 of the gear reduction box 50 provides the motive power. This arrangement is seen in Figs. 2 and 7. Since the drive sprockets 49, which are of identical size, are rotated at the same speed, the speed of rotation transmitted to the two shafts 24 through the connecting drive chains 56 and the sprockets 57 on said shafts 24 is the same for each shaft. This results in the pairs of lift chain drive sprockets 22 on both sides of the processing apparatus being driven at identical speeds. Although the four lift chains 13 are thus run at the same speed, each lift rail is secured by the brackets 27 at its corresponding pair of chains at relatively different positions on said chains, whereby the two rails, though horizontal, are ordinarily at different elevations and the one rail precedes the other and remains constantly in advance thereof as these reciprocate between the raised and lowered positions. This relationship may be noted in Fig. 2 whereby it will become apparent that the lift rails are so positionally related that when the sheet holders are withdrawn from the solutions, the supporting bars 21 must necessarily be inclined in one direction as the bars proceed upwardly, the inclination being reversed as the mounting brackets 27 ride over the sprockets 22 and the pair of the lift rails begin their downward descent. It will thus be seen that as the holders to which the sensitized materials are secured are raised out of the processing solutions by the operation of the lift rails, the holders will be inclined to facilitate drainage from a corner of the sensitized material and as the direction of movement of the lift rails is reversed, the inclination of the sheet holders is similarly reversed and drainage is had from the other lower corner of the sensitized material. It is well known that this type of point drainage provides the best results and is ordinarily recommended and followed in the hand processing of sheet materials. The machine which embodies the present invention provides the same type of desirable point drainage automatically.

It will be obvious, too, that as the lift rails descend, first one and then the other end of the supporting bar 21 will be dropped into a notch on either side of the tops of the processing tanks. In doing so the supporting bar again attains a horizontal position and remains thus while the lift rails continue in their downward motion, reverse their direction and again move upwardly and engage the supporting bar anew. It will now be obvious why one of the two openings in the perforated elements 44 and 45 at the ends of the supporting bar is a slot rather than a round opening, the reason therefor being to permit longitudinal shift of the lift pin 41 therein as the inclination of the supporting bar 21 alternates between its highest numerical value and zero, the latter being the case when both ends of the supporting bar are bottomed in the V-shaped notches and when one of the lift rails has begun its downward descent while the other is still travelling upwardly.

Another feature of the present invention resides in the means which are provided to increase the step-by-step movement of the sheet holders 16 from a distance which is equal to the longitudinal shift of the lift rails 12 to a somewhat greater distance. Such a provision is desirable because by it, it is possible to decrease the relative time that the sensitized material is immersed in any particular tank by having it move in a single cycle of travel of the lift rails a distance greater than that in which such rails ordinarily move horizontally during said one cycle, thereby decreasing the number of immersions in any particular tank. Moreover, the increased distance of longitudinal movement facilitates the transfer of a sheet holder from one tank to the next where the increased distance is desirable in order that the partition between the two tanks may be safely cleared. The means by which this distance is so increased comprises a slide bar 58 which is mounted within the channel of each lift rail 12. The slide bars 58 like the rails 12 have a channel cross section as may be noted in Figs. 4, 6 and 8. The slide bar is slideably mounted within the lift rail to permit the former to move longitudinally relative to the latter a distance which is equal to the desired increase in the step-by-step movement of the sheet holders as will be clearly understood. The sliding connection of the slide bar is provided by the following means. A guide bracket 59 is fixedly secured within the channel of the lift rail, one such bracket being located near each end of each lift rail. The construction and manner of securing the guide bracket to the lift rail is illustrated in Figs. 9 and 10. Adapted to ride in the slot 60 which is provided by the guide bracket 59 is a roller 61 which is secured within the channel of the slide bar 58. Since two guide brackets are provided in each lift rail, a pair of coacting rollers 61 are similarly provided on each slide bar. The slot or groove 60 which the bracket 59 provides is not of uniform width but has a slightly increased width at each end to provide a slight depression 62 at each end thereof in which the roller 61 may bottom to be releasably retained therein to provide a more accurate positioning of the roller at either end of the guide bracket 59.

Longitudinal movement of the slide bar 58 is produced as the lift rail approaches the ends of its upward and downward movements. To obtain this motion the slide bar 58 is provided with another roller 63 which is mounted on the outside of the channel constituting the slide bar 58. In addition, elements 64 and 65 providing cam surfaces are positioned near the top and bottom, respectively, of the supporting frame 10 and are so located relative to the composite lift rail and slide bar that the roller 63 will engage the upper cam surface 64 as the lift rail is elevated, whereby this roller will be shifted longitudinally as it travels along the cam surface to in turn shift the slide bar 58 from one extremity to the other in reference to the lift rail. During this operation the roller 61 is forced out of the depression 62 at one end of the slot 60 and moved to the other end thereof to drop into the depression at said other end of the slot. By properly dimensioning the elements which constitute the guide bracket 59 and the cams 64 and 65 the horizontal distance through which the slide bar 58 travels relative to the lift rail can be made as small or large as desired. To utilize this sliding motion of the slide bar 58 to increase the increment of distance through which a sheet holder 16 is transported during a single cycle of operation of the lift rails, the slide bar 58 is provided with straps 66 which are removably secured thereto and which have an offset portion projecting above the top flange of the lift rail 12 as may be clearly seen in Figs. 4 and 8. To this offset portion is secured lift pin 67 which functions in much the same manner as the lift pins 41 except that, whereas lift pins 41 are advanced a distance equal to the longitudinal movement of the lift rail 12, the lift pins 67 are advanced a distance which is equal to the sum of the longitudinal shift of the lift rail and the distance the slide bar shifts relative to the lift rail.

After the slide bar 58 has been shifted by reason of the roller 63 being contacted by the cam 64, the lift rail 12 in which the slide bar is mounted begins its downward motion and, after depositing the supporting bar of sheet holder 16 in certain of the notches 20 along the top edges of the row of processing tanks, the lift rail continues further downwardly to a point at which the roller 63 makes contact with cam 65 which functions to move the roller 63 and the slide bar to which it is attached in a direction opposite to that in which the cam 64 at the top of the apparatus moved this roller and slide bar. The cam elements 64 and 65 produce equal and opposite longitudinal displacements of the roller 63 and the associated slide bar 58. Upon reaching the bottom of its cycle it will be understood that the slide bar 58 has been shifted through a distance such that the rollers 61 are now bottomed in the depressions at the opposite ends of the slots provided by the guide brackets 59.

The lift pins 41 and the straps 66 with their associated lift pins 67 are removably secured to the lift rails and slide bars, respectively, so that the relative times of immersion in the several tanks may be arranged at the will of the operator. Thus to shorten the relative time of immersion of the sensitized material in any one of the tanks, it is only necessary to remove several of the lift pins 41 and to secure the necessary straps 66 to the slide bar whereby the step-by-step progress of sensitized material through any one tank may be increased causing correspondingly fewer number of immersions in the said tank. The cam elements 64 and 65 are in the present apparatus formed with a turned or angled edge to provide the cam surface. Slots 68 are provided in the cams whereby in fastening these to the supporting frame 10 they may be shifted before tightening the securing bolts 69 for the purpose of adjustment of the positioning of the cams. This construction may be noted in Fig. 11.

The loading or feed rack 15 has been described briefly above in connection with the construction of the sheet holders 16 and the means thereon which facilitates the correct positioning of the holders upon the rack by the operator. The feed rack consists of a pair of laterally spaced elements 43 having V-shaped notches therein of a configuration and size conforming to those in the upper edges of the processing tanks. Like those on the tanks they serve the purpose of holding the supporting bars 21 of the sheet holders as the latter are transported step-by-step by the operation of lift rails. The elements 43 include series of notches whereby the operator may place several sheet holders on the rack at one time, the lift rails being sufficiently long to raise the supporting bar from the furtherest pair of notches in the rack as the rails travel upwardly and then deposit it in the next pair of notches as the rails descend. In this manner the sheet holders progress along the rack until a supporting bar 21 is deposited in the last pair of notches. The next cyclic operation of the lift rails then raises the bar 21 therefrom and upon descending lowers it into the first of the several processing tanks. In this operation the lift pins 67 secured by straps to the slide bars 58 are preferably employed to engage the supporting bar of the sheet holder since a somewhat greater longitudinal movement of the holder will be desired in order that this may adequately clear the end of the rack 15 and the rear end of the first tank.

The sheet holder 16 after reaching a position in the last of the several tanks corresponding to the last immersion in that tank is with the elevating of the lift rails 12 raised out of the solution and then advanced longitudinally of the apparatus as usual. The distance through which the holder is thus advanced will be equal either to the longitudinal shift of the lift rail or to the sum of the relative movement between the slide bar and the lift rail and the longitudinal shift of said lift rail, depending upon whether pins 41 on lift rails 12 or pins 67 on straps 66 secured to slide bars 58 are employed to engage the sheet holder in this last cycle of operation. However, instead of again being immersed in the tank, the downward motion of the lift rails instead deposits the supporting bar 21 on the unloading rack 17. The rack 17 comprises a pair of downwardly inclined slides 70 having upwardly projecting lugs at the lower ends thereof which retain the supporting bars of the sheet holders on the slides 70 until they are removed manually by the operator. Since the supporting bar 21 of a sheet holder which is about to be deposited on the slide 70 is inclined as it approaches the rack 17, one end thereof will make contact with one of the two slides 70 well in advance of the other end making contact with the other of the two slides. Since the end first making contact would have a tendency to slip down the length of the slide, even before the other end made contact with the other slide, thereexists the possibility of the slide holder jamming on the rack 17. To preclude this possibility, there may be provided the latch mechanism 71 and coacting microswitch 75 illustrated in Figs. 12 and 13, respectively. These units, however, have not been shown in the perspective assembly views seen in Figs. 1 and 2.

The latch mechanism 71 is positioned on the inner surface of the slide 70 which is first contacted by the descending supporting bar. It comprises a latch element 72 which is biased by the spring 73 to normally retain it in a position in which it projects above the surface of the slide 70, as illustrated in dashed lines in Fig. 12. The latch 72, however, is retractable by the operation of the plunger of solenoid 78 to which it is connected through linkage 74. The position of the latch as indicated in full lines in Fig. 12 shows it in retracted position resulting from the operation of the solenoid 78. The other of the two slides 70 is provided on its inner surface with a microswitch 75. A contact element or roller 76 projects slightly above the slide 70, being spring biased in this position. However, upon the other end of the supporting bar 21 making contact therewith, this element 76 is pressed downwardly to close the microswitch through the rotation of the bell crank 77. The combined operation of the latch mechanism and the microswitch will be readily apparent. Upon the lower end of the supporting bar of the sheet holder first making contact with the latch element 72, this bar is retained against further progress down the slide 70 by the latch which projects above the slide. In the meantime, the other end of the bar 21 continues to descend until it in turn makes contact with the element 76 to thereby close the microswitch 75 which thus actuates the solenoid 78. This retracts the latch 72 and the two ends of the supporting bar 21 are thus simultaneously free to progress down the two slides 70 whereupon jamming of the sheet holder between the slides is substantially precluded.

Figure 14:
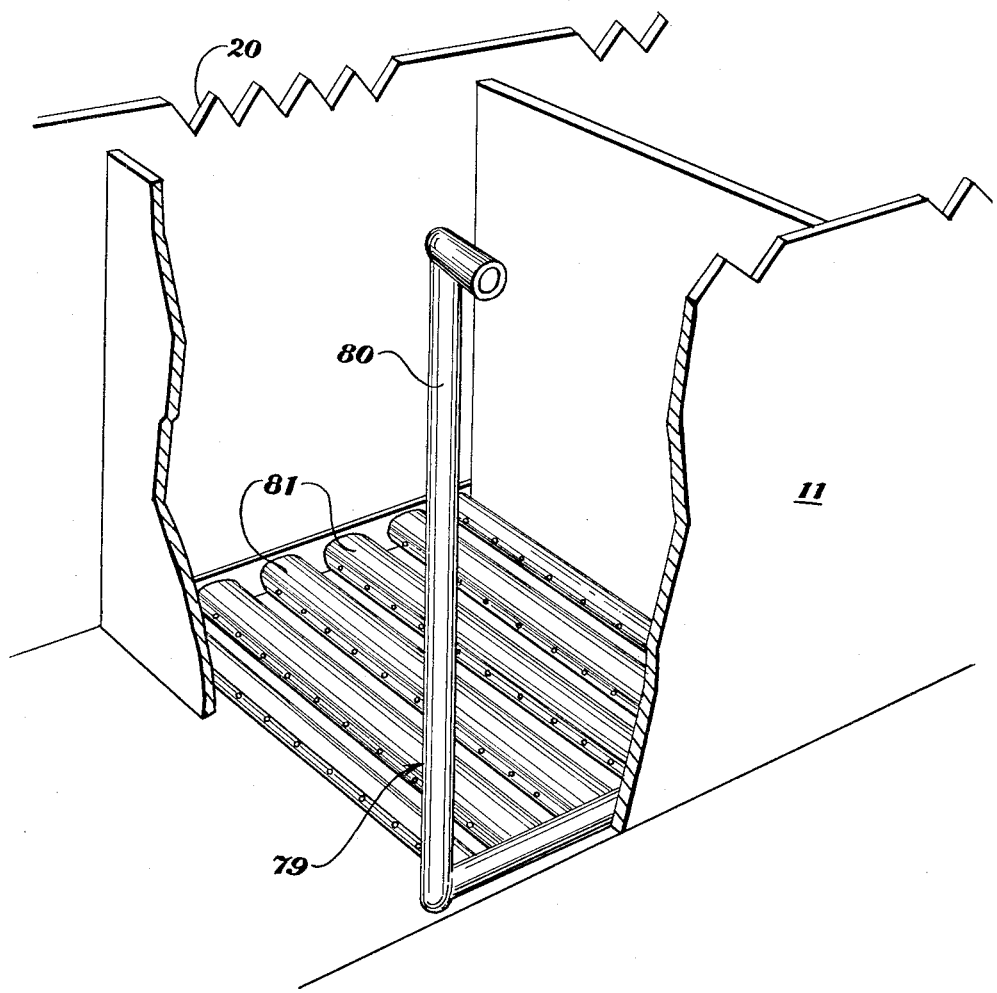
Fig. 14 is a perspective view of one of the processing tanks, the walls of which have been cut away to illustrate the means employed to provide gaseous agitation of the processing solution.

Still another feature of the present invention is the means provided in several of the tanks for agitation of the processing liquids. It is well known that the release of gas bubbles at a point in the solution near the bottom of the tank serves the useful purpose of agitating the processing solution. However, it has been found that the constant release of gas bubbles tends to produce definite flow lines within the solution which results in nonuniform development of the immersed sensitized materials. In the herein described processing machine this method of gas agitation is modified to the extent that instead of a constant release of gas there is provided intermittent bursts of gas which function to eliminate the formation of a definite flow pattern within the processing solutions. As a result thereof, considerably more uniform development across the surface of the sensitized sheet is obtainable. In Fig. 14 there is illustrated a gas distributor rack 79 which includes an inlet tube 80 which admits the gas to a series of perforated transverse tubes 81. The transverse tubes are of such a number and so positioned relative to the notches 20 in the top edges of the tank that the intermittent gaseous discharges from the perforations in said transverse tubes take place between the sensitized sheets which are held in sheet holders 16 which are suspended in the tank from the supporting bars 21 bottomed in the said notches 20. This arrangement is clearly depicted in Fig. 14.

Although the notched edges in the series of tanks are illustrated in the drawings as being interrupted at those places where the cross partitions are located, since here the increased travel obtained by operation of the slide bars 58 is resorted to to adequately clear the partitions, it is understood that such top edges of the tanks may be continuously notched through their entire length and removable cross partitions employed whereby the size and number of the several tanks may be readily varied at will in accordance with the particular processing operation to which the machine is to be put. Moreover, instead of such removable partitions, a large single tank may be employed having continuously notched top edges together with a series of separate tank units of different sizes which can be inserted in the large single tank in any desired combination to readily adapt the apparatus to the specific processing operation at hand. By further arranging the lift pins 41 and 67 on the lift rails and slide bars, respectively, to conform to the specific arrangement of tank units, or removable partitions as the case may be, the necessary clearances may be obtained for the transfer of the sheet holders from one tank to the next, or for the transporting of the same over the removable partitions.

Although we have described an apparatus which is especially adapted for photographic processing, it is apparent that the invention will be equally applicable to an apparatus intended for the fluid treatment of non-photographic materials, especially where such treatment includes subjecting sheet material to the action of several treating solutions.

From the foregoing description it will be apparent that we have provided means for obtaining all the objects and advantages of this invention.

What we claim and desire to secure by Letters Patent of the United States is:

1. A photographic processing apparatus comprising a tank, a sensitized sheet holder including a supporting bar having laterally extending arms adapted to extend beyond and rest upon the top edges of the opposite sides of said tank when the sensitized sheet is immersed therein, a lift rail along each of said opposite sides of the tank, a series of endless, lift chains, a pivotal connection between each end of each of said lift rails and a different one of said series of lift chains whereby the two rails are horizontally supported between pairs of chains and one rail is normally offset vertically from the other as the rails are both being raised or are both being lowered by said lift chains, and means driving said lift chains at identical speeds whereby said lift rails are vertically raised and lowered between positions below and above the top edges of the tank and longitudinally shifted forward and backward as the rails reverse their upward and downward travel, said rails being adapted to engage and raise said supporting bar arms as said rails move above the top edges of said tank.

2. A photographic processing apparatus comprising a tank, a sensitized sheet holder including a supporting bar having laterally extending arms, means along the top edges of the opposite sides of said tank adapted to be engaged by said laterally extending arms when the sensitized sheet is immersed in said tank, a lift rail along each of said opposite sides of the tank, a pair of endless, vertical lift chains, means pivotally connecting the ends of one of said lift rails to corresponding portions of the lift chains whereby the rail is supported in a horizontal position, a second pair of endless, vertical lift chains, means pivotally connecting the ends of the other of said lift rails to corresponding portions of the second pair of lift chains whereby the other rail is supported in a horizontal position but vertically advanced in respect to the horizontal position of the first rail, sprockets for driving each of said lift chains, drive means adapted to rotate said sprockets whereby the chains are driven at identical speeds, and means on said lift rails adapted to engage said supporting bar arms to raise said holder from said tank as said rails move above the top edges of said tank, the holder being tilted as it is raised and lowered by the rails as a result of the one rail being vertically advanced in respect to the other whereby point drainage from the sensitized sheet is automatically obtained when the holder is withdrawn from the tank by operation of the lift chains.

3. A photographic processing apparatus comprising a tank, a sensitized sheet holder including a supporting bar having laterally extending arms adapted to extend beyond and rest upon the top edges of the opposite sides of said tank when the sensitized sheet is immersed therein, a lift rail along each of said opposite sides of the tank, each lift rail including a slide bar mounted thereon and adapted for movement longitudinally of the rail between predetermined limits, a pair of endless, vertical lift chains, means pivotally connecting the ends of one of said lift rails to corresponding portions of the lift chains whereby the rail is supported in a horizontal position, a second pair of endless, vertical lift chains, means pivotally connecting the ends of the other of said lift rails to corresponding portions of the second pair of lift chains whereby the other rail is supported in a horizontal position, sprockets for driving each of said lift chains, drive means adapted to rotate said sprockets whereby the chains are driven at identical speeds, means on said slide bars adapted to engage said laterally extending arms of the supporting bar to raise said sheet holder from said tank as said rails move above the top edges of said tank, and cam means adapted to be engaged by the slide bars as the lift rails approach the upper and lower limits of their vertical movement whereby the slide bars are longitudinally reciprocated between said predetermined limits.

4. A photographic processing apparatus comprising a tank, a sensitized sheet holder including a supporting bar having laterally extending arms adapted to extend beyond and rest upon the top edges of the opposite sides of said tank when the sensitized sheet is immersed therein, a lift rail along each of said opposite sides of the tank, a slide bar mounted on each lift rail and adapted for longitudinal movement between predetermined limits relative to the lift rail, a pair of endless, vertical lift chains, means pivotally connecting the ends of one of said lift rails to corresponding portions of the lift chains whereby the rail is supported in a horizontal position, a second pair of endless, vertical lift chains, means pivotally connecting the ends of the other of said lift rails to corresponding portions of the second pair of lift chains whereby the other rail is supported in a horizontal position, sprockets for driving each of said lift chains, drive means adapted to rotate said sprockets whereby the chains are driven at identical speeds, engaging means on said lift rails and on said slide bars, means on said laterally extending arms of the supporting bar adapted to be engaged by either the engaging means on said lift rails or on said slide bars to raise the sheet holder from said tank as the rails move above the top edges of said tank, a projection on each slide bar, upper cam means engageable by the projections on said slide bars as the latter approach the upper limits of their vertical movement whereby the slide bars are moved longitudinally of their respective lift rails and in the direction in which the sheet holder traverses the length of said tank, and lower cam means engageable by said projections as the slide bars approach the lower limits of their vertical movement whereby the slide bars are moved longitudinally of their respective lift rails and in a direction opposite to that of the longitudinal movement caused by the contact of the projections with the upper cam means.

5. A photographic processing apparatus according to claim 4 in which one of the two lift rails supported horizontally between pairs of lift chains is vertically advanced in respect to the other.

6. A photographic processing apparatus comprising a tank, a sensitized sheet holder including a supporting bar having laterally extending arms adapted to extend beyond and rest upon the top edges of the opposite sides of said tank when the sensitized sheet is immersed therein, a lift rail along each of said opposite sides of the tank, means for vertically moving each rail upwardly and downwardly between positions below and above the top edges of the tank, said means being adapted to continuously maintain one rail in advance of the other, a slide bar mounted on each lift rail and adapted to slide longitudinally relative thereto between predetermined limits, engaging means on said slide bars, said laterally extending arms of the supporting bar being adapted to be engaged by the engaging means on said slide bars to raise the sheet holder from said tank as the rails move above the top edges of said tank, upper cam means adapted to engage said slide bars as the latter approach the upper limits of their vertical movement whereby the slide bars are shifted longitudinally of their respective lift rails and in the direction of travel of the sheet holder through said tank, and lower cam means adapted to engage said slide bars as the latter approach the lower limits of their vertical movement whereby the slide bars are shifted longitudinally of their respective lift rails and in a direction opposite to that of the shift of the bars caused by the contact therewith of the upper cam means.

7. A photographic processing apparatus comprising a tank, the top edges of the opposite sides of which are serrated, a sensitized sheet holder including a supporting bar having laterally extending arms which are adapted to be received in the serrations in the top edges of the opposite sides of said tank when the sensitized sheet is immersed therein, a feed rack comprising a pair of serrated elements positioned at one end of said tank and adapted to retain thereon the laterally extending arms of the supporting bar of said sheet holder prior to its first immersion in said tank, a lift rail along each of said opposite sides of the tank which extends substantially the length of said tank and the length of the serrated elements of the feed rack, means for vertically reciprocating each rail upwardly and downwardly between positions below and above both the top edges of the tank and the serrated elements of the feed rack, a slide bar mounted on each lift rail and adapted to slide longitudinally relative thereto between predetermined limits, engaging means on said slide bars, said laterally extending arms of the supporting bar being adapted to be engaged by said engaging means on the slide bars to raise the sheet holder from said feed rack and from said tank as the lift rails move above the serrated elements of the feed rack and the top edges of the tank, upper cam means adapted to engage said slide bars as the latter approach the upper limits of their vertical movement whereby the slide bars are shifted longitudinally of their respective lift rails and in the direction of travel of the sheet holder through said tank, and lower cam means adapted to engage said slide bars as the latter approach the lower limits of their vertical movement whereby the slide bars are shifted longitudinally of their respective lift rails and in a direction opposite to that of the shift of the bars caused by the contact therewith of the upper cam means.

8. A photographic processing apparatus comprising a series of tanks arranged linearly, the top edges of the opposite sides of which are serrated, a sensitized sheet holder including a supporting bar having laterally extending arms which are adapted to be received in the serrations in the top edges of the opposite sides of said tanks when the sensitized sheet is immersed therein, a feed rack comprising a pair of serrated elements positioned at one end of said series of tanks and adapted to retain thereon the laterally extending arms of the supporting bar of said sheet holder prior to its immersion in the first of said series of tanks, a lift rail along each of said opposite sides of the series of tanks extending substantially the length of said tanks and the length of the serrated elements of the feed rack, a pair of endless, vertical lift chains, means pivotally connecting the ends of one of said lift rails to corresponding portions of the lift chains whereby the rail is supported in a horizontal position, a second pair of endless, vertical lift chains, means pivotally connecting the ends of the other of said lift rails to corresponding portions of the second pair of lift chains whereby the other rail is supported in a horizontal position but vertically advanced in respect to the horizontal position of the first rail, sprockets for driving each of said lift chains, drive means adapted to rotate said sprockets whereby the chains are driven at identical speeds, a slide bar mounted on each lift rail and adapted to slide longitudinally relative thereto between predetermined limits, engaging means on said lift rails and on said slide bars, said laterally extending arms of the supporting bar being adapted to be engaged by either the engaging means on said lift rails or on said slide bars to raise the sheet holder from said feed rack and from said tanks as the lift rails move above the serrated elements of the feed rack and the top edges of said tanks, means adapted to engage said slide bars as the latter approach the upper limits of their vertical movement to cause these to be shifted longitudinally of their respective lift rails and in the direction of travel of the sheet holder through said series of tanks, and means adapted to engage said slide bars as the latter approach the lower limits of their vertical movement to cause these to be shifted longitudinally of their respective lift rails and in a direction opposite to that of the travel of the sheet holder through said series of tanks.

9. A photographic processing apparatus comprising a tank, the top edges of the opposite sides of which are serrated, a sensitized sheet holder including a supporting bar having laterally extending arms which are adapted to be received in the serrations in the top edges of the opposite sides of said tank when the sensitized sheet is immersed therein, an unloading rack comprising a pair of downwardly inclined slides positioned at one end of said tank and adapted to receive thereon the laterally extending arms of the supporting bar of said sheet holder after its last immersion in said tank, a lift rail along each of said opposite sides of the tank, means for vertically reciprocating each rail upwardly and downwardly between positions below and above both the top edges of the tank and the downwardly inclined slides of the unloading rack, a slide bar mounted on each lift rail and adapted to slide longitudinally relative thereto between predetermined limits, engaging means on said slide bars, said laterally extending arms of the supporting bar being adapted to be engaged by said engaging means on the slide bars to raise the sheet holder from said tank as the lift rails move above the top edges of the tank, upper cam means adapted to engage said slide bars as the latter approach the upper limits of their vertical movement whereby the slide bars are shifted longitudinally of their respective lift rails and in the direction of travel of the sheet holder through said tank, and lower cam means adapted to engage said slide bars as the latter approach the lower limits of their vertical movement whereby the slide bars are shifted longitudinally of their respective lift rails and in a direction opposite to that of the shift of the bars caused by the contact therewith of the upper cam means.

10. A photographic processing apparatus comprising a series of tanks arranged linearly, the top edges of the opposite sides of which are serrated, a sensitized sheet holder including a supporting bar having laterally extending arms which are adapted to be received in the serrations in the top edges of the opposite sides of said tanks when the sensitized sheet is immersed therein, an unloading rack comprising a pair of downwardly inclined slides positioned at one end of said series of tanks and adapted to receive thereon the laterally extending arms of the supporting bar of said sheet holder after its immersion in the last of said series of tanks, a lift rail along each of said opposite sides of the series of tanks, a pair of endless, vertical lift chains, means pivotally connecting the ends of one of said lift rails to corresponding portions of the lift chains whereby the rail is supported in a horizontal position, a second pair of endless, vertical lift chains, means pivotally connecting the ends of the other of said lift rails to corresponding portions of the second pair of lift chains whereby the other rail is supported in a horizontal position but vertically advanced in respect to the horizontal position of the first rail, sprockets for driving each of said lift chains, driving means adapted to rotate said sprockets whereby the chains are driven at identical speeds, a slide bar mounted on each lift rail and adapted to slide longitudinally relative thereto between predetermined limits, engaging means on said lift rails and on said slide bars, said laterally extending arms of the supporting bar being adapted to be engaged by either the engaging means on said lift rails or on said slide bars to raise the sheet holder from said tanks as the lift rails move above the top edges of said tanks, means adapted to engage said slide bars as the latter approach the upper limits of their vertical movement to cause these to be shifted longitudinally of their respective lift rails and in the direction of travel of the sheet holder through said seires of tanks, and means adapted to engage said slide bars as the latter approach the lower limits of their vertical movement to cause these to be shifted longitudinally of their respective lift rails and in a direction opposite to that of the travel of the sheet holder through said series of tanks.

11. A photographic processing apparatus comprising a tank, the top edges of the opposite sides of which are serrated, a sensitized sheet holder including a supporting bar having laterally extending arms which are adapted to be received in the serrations in the top edges of the opposite sides of said tank when the sensitized sheet is immersed therein, a feed rack comprising a pair of serrated elements positioned at one end of said tank and adapted to retain thereon the laterally extending arms of the supporting bar of said sheet holder prior to its first immersion in said tank, an unloading rack comprising a pair of downwardly inclined slides positioned at the other end of said tank and adapted to receive thereon the laterally extending arms of the supporting bar of said sheet holder after its last immersion in said tank, a lift rail along each of said opposite sides of the tank which extends substantially the length of said tank and the length of the serrated elements of the feed rack, means for vertically reciprocating each rail upwardly and downwardly between positions below and above the top edges of the tank, the serrated elements of the feed rack and the pair of downwardly inclined slides of the unloading rack, a slide bar mounted on each lift rail and adapted to slide longitudinally relative thereto between predetermined limits, engaging means on said slide bars, said laterally extending arms of the supporting bar being adapted to be engaged by said engaging means on the slide bars to raise the sheet holder from said feed rack and from said tank as the lift rails move above the serrated elements of the feed rack and the top edges of the tank, upper cam means adapted to engage said slide bars as the latter approach the upper limits of their vertical movement whereby the slide bars are shifted longitudinally of their respective lift rails and in the direction of travel of the sheet holder through said tank, and lower cam means adapted to engage said slide bars as the latter approach the lower limits of their vertical movement whereby the slide bars are shifted longitudinally of their respective lift rails and in a direction opposite to that of the shift of the bars caused by the contact therewith of the upper cam means.

12. A photographic processing apparatus comprising a series of tanks arranged linearly, the top edges of the opposite sides of which are serrated, a sensitized sheet holder including a supporting bar having laterally extending arms which are adapted to be received in the serrations in the top edges of the opposite sides of said tanks when the sensitized sheet is immersed therein, a feed rack comprising a pair of serrated elements positioned at one end of said series of tanks and adapted to retain thereon the laterally extending arms of the supporting bar of said sheet holder prior to its immersion in the first of said series of tanks, an unloading rack comprising a pair of downwardly inclined slides positioned at the other end of said series of tanks and adapted to receive thereon the laterally extending arms of the supporting bar of said sheet holder after its immersion in the last of said series of tanks, a lift rail along each of said opposite sides of the series of tanks extending substantially the length of said tanks and the length of the serrated elements of the feed rack, a pair of endless, vertical lift chains, means pivotally connecting the ends of one of said lift rails to corresponding portions of the lift chains whereby the rail is supported in a horizontal position, a second pair of endless, vertical lift chains, means pivotally connecting the ends of the other of said lift rails to corresponding portions of the second pair of lift chains whereby the other rail is supported in a horizontal position but vertically advanced in respect to the horizontal position of the first rail, sprockets for driving each of said lift chains, drive means adapted to rotate said sprockets whereby the chains are driven at identical speeds, a slide bar mounted on each lift rail and adapted to slide longitudinally relative thereto between predetermined limits, engaging means on said lift rails and on said slide bars, said laterally extending arms of the supporting bar being adapted to be engaged by either the engaging means on said lift rails or on said slide bars to raise the sheet holder from said feed rack and from said tanks as the lift rails move above the serrated elements of the feed rack and the top edges of said tanks, means adapted to engage said slide bars as the latter approach the upper limits of their vertical movement to cause these to be shifted longitudinally of their respective lift rails and in the direction of travel of the sheet holder through said series of tanks, and means adapted to engage said slide bars as the latter approach the lower limits of their vertical movement to cause these to be shifted longitudinally of their respective lift rails and in a direction opposite to that of the travel of the sheet holder through said series of tanks.

References Cited in the file of this patent

UNITED STATES PATENTS

| | | |
|---|---|---|
| 1,158,386 | Oiler | Oct. 26, 1915 |
| 1,664,127 | Mills | Mar. 27, 1928 |
| 1,670,673 | Williams | May 22, 1928 |
| 1,842,890 | Williams | Jan. 26, 1932 |
| 1,863,689 | Dye | June 21, 1932 |
| 2,194,345 | Winans | Mar. 19, 1940 |
| 2,401,623 | Dye et al. | June 4, 1946 |
| 2,518,034 | Ludwig | Aug. 8, 1950 |
| 2,545,031 | Izzi | Mar. 13, 1951 |